United States Patent [19]

Dauphinee

[11] 3,757,205

[45] Sept. 4, 1973

[54] CONDUCTIVITY MEASURING APPARATUS

[75] Inventor: Thomas M. Dauphinee, Ottawa, Ontario, Canada

[73] Assignee: Canadian Patents and Development Limited, Ottawa, Ontario, Canada

[22] Filed: Oct. 4, 1971

[21] Appl. No.: 186,230

[52] U.S. Cl. .................. 324/30 R, 324/64, 324/118
[51] Int. Cl. .......................................... G01n 27/42
[58] Field of Search .................. 324/30 R, 30 B, 64, 324/118

[56] References Cited
UNITED STATES PATENTS 3,474,330 10/1969 Dauphinee ....................... 324/30 B
3,495,164 2/1970 Dauphinee ....................... 324/30 B Primary Examiner—Michael J. Lynch
Attorney—James R. Hughes

[57] ABSTRACT

A conductivity measuring apparatus for measuring the conductivity of liquids, e.g. sea-water in which isolating choppers are used to provide square wave voltages to the current electrodes in the salinity cell and an operational amplifier senses the voltage across the electrodes in relation to the voltage on a reference resistor and generates a square wave current which passes through the current electrodes and the reference resistor. This current is proportional to the conductance of the salinity cell.

3 Claims, 1 Drawing Figure

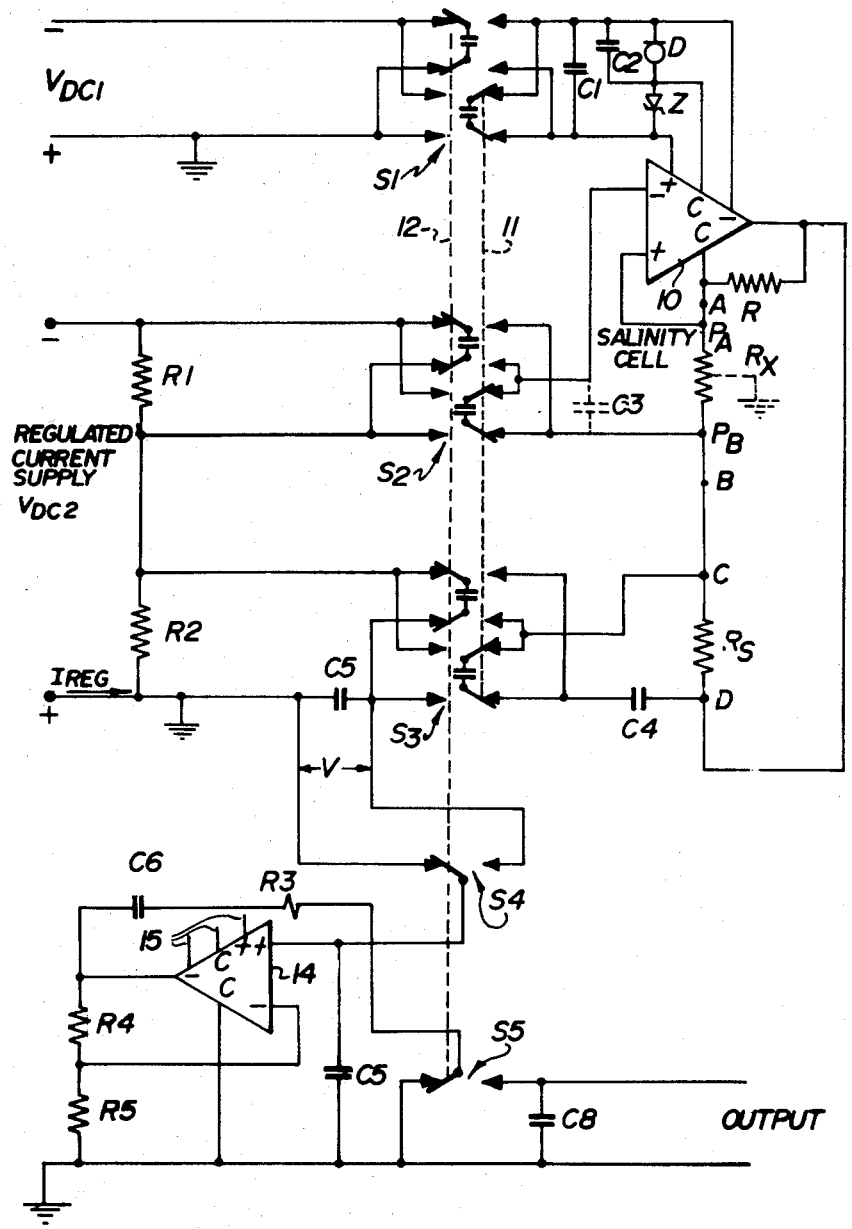

CONDUCTIVITY MEASURING APPARATUS

This invention relates to conductivity measuring apparatus and more particularly to apparatus for measuring the conductivity of a liquid, e.g. sea water.

In U.S. Pat. No. 3,495,164 dated Feb. 10, 1970 and entitled Conductivity Measurement Apparatus, applicant has described a salinometer device developed primarily for use in oceanographic surveys but useful in other conductivity measuring applications. Salinity is related to conductivity and therefore can be measured by measuring the conductivity. The sensing apparatus is lowered into the sea on the end of a long cable while the recording device remains on board ship and is connected to the sensing apparatus via the cable.

Liquid conductivity measurements normally involve the measurement of the voltage between two electrodes positioned in the liquid and through which a regulated DC current is flowing. However, conductivity measurements using DC current are inaccurate because of polarization effects at the electrodes. This may be avoided by using AC current but this approach encounters problems because of phase shifts in the AC system due to the high frequencies which must be employed to avoid polarization changes during the cycle and in regulating the AC current and is in general not suitable for deflection systems or ones that cannot be frequently recalibrated. The apparatus described in U.S. Pat. No. 3,495,164 avoids the above difficulties by using a regulated source of DC current and by electrically isolating the measuring circuit from the recording circuit. The regulated DC current is mechanically "chopped" to provide a square wave comprising positive and negative pulses which are fed to current electrodes of a hollow elongated sampling cell adapted to receive the liquid whose conductivity is to be measured. Two other electrodes, usually but not necessarily located between the current electrodes, serve as potential terminals of the cell. The sampling cell is supplied with regulated reversing square wave current which eliminates the effects of polarization at the current electrodes. The present invention is an improved and modified version of the apparatus of U.S. Pat. No. 3,495,164.

Referring to the single drawing, two current electrodes represented by points A and B and two potential electrodes represented by points $P_A$ and $P_B$ are positioned in the liquid whose conductivity is to be measured with the effective resistance between the potential electrodes $P_A$ and $P_B$ when A and B are used as current electrodes being represented as $R_x$. The actual electrodes in the salinity cell are not shown but are normally ring-shaped and positioned at fixed spacings along the inside of sampling cell. An operational amplifier 10 with load resistance R across the output if high cell resistances are expected has its output connected in series to liquid resistance $R_x$ via current electrodes A and B and a standard reference resistance $R_s$ between points C and D. The amplifier is connected to a power supply $V_{DC1}$ via an isolating chopper S1 and voltage reference means comprising storage capacitors C1 and C2, current regulation diode D and zener diode Z. A reversing square wave voltage obtained from regulated current supply $V_{DC2}$ via resistor R1, reversing isolating chopper S2, and a low value storage capacitor C3 (shown dotted because inherent capacitance is frequently sufficient for this purpose) plus the voltage appearing across $R_x$ i.e. between electrodes $P_A$ and $P_B$ is applied to the input terminals of the amplifier 10. The amplifier acts as a current source driving a current through resistances $R_x$ and $R_s$ of such magnitude and direction as to bring the input terminals to zero in effect making the voltage across $R_x$ equal and opposite that across resistance R1 (capacitance C3). Because the isolating choppers are reversed at a predetermined rate, the input voltage is a reversed (modulated) square wave and the current passing through $R_s$ and $R_x$ is a square wave current of precise shape and magnitude which if $V_{DC2}$ is constant is a linear function of $1/R_x$, the conductance of the cell. The circuit described so far might be considered as a bridge with the operational amplifier effective to provide balance. To provide this it produces, in fact is forced to produce, the correct square wave current proportional to the conductance of the salinity cell through reference resistor $R_s$ for measurement purposes. This circuit avoids the problem of incorrect square wave current flow through the liquid sample due to polarization at the current electrodes during the course of the reversing cycle. Changes of polarization of significant magnitude at the potential electrodes do not occur because no current is being drawn from them.

The voltage across the reference resistor (a square wave voltage) is sampled and demodulated by isolating reversing chopper S3 which is reversed in synchronism with choppers S2 and S1 as represented by gang lines 11 and 12. Capacitor C4 prevents any DC component of the voltage across reference resistor $R_s$ from affecting the measurement. The rectified square-wave voltage (V) is stored on storage capacitor C5 and sampled by means of chopper switch S4 and applied to operational amplifier 14 having suitable power supply connections 15 which produces a voltage related to the conductivity of the liquid to an output reading device via isolating capacitor C6 and demodulating switch S5.

For best accuracy the contacts of chopper $S_3$ should close after the $S_2$ contacts close and open before the $S_2$ contacts open to ensure that the capacitors connected to $S_3$ are only connected to $R_s$ when the current through $R_s$ is at its equilibrium value.

In the circuit as shown, the voltage across capacitor C5 at equilibrium will be zero (or null) when the cell conductance $G_x = 1/R_x = R_2/R_1 R_s$, and the value of R2 required to give balance therefore is a linear function of the conductance $G_x$, a very useful feature. Similarly the voltage across C5 is $(G_x R_1 R_s - R2)I_{REG}$ and therefore if amplifier 14 has known and constant gain, the output voltage will be a known linear function of the cell conductance.

In a circuit built and used experimentally the actual values of some of the components were as follows:

$$R1 = 100 \text{ ohms}$$

$$R2 = R_s = 200 \text{ ohms}$$

$$V_{DC} = 20V$$

REGULATED CURRENT SUPPLY = 5 ma.

These, of course, are only typical values. The reversing isolating choppers are preferably of the type described in U.S. Pat. No. 2,798,198 dated July 2, 1957.

Different types of voltage measuring devices may be used to measure the voltage (V) on capacitor C5 and provide an output reading. The DC amplifier circuit shown however has many advantages and has proven to be ideal for this purpose. It features high input impedance and low output impedance, a precisely defined and constant gain over a very wide dynamic range, and effectively zero offset even in the presence of reasonable potential differences between the input and output circuits. The amplifier operates as follows. A contact modulator or chopper S4 switches the + input terminal of an operational amplifier 14 between the two sides of the voltage to be measured (in this case V and ground). The amplifier gain ($G = (R5 + R4)/R5$) is fixed by feedback resistors R4 and R5 and the output includes a current limiting resistor R3 and capacitor C6 in series. A second chopper S5 synchronous with chopper S4 but preferably arranged to have less dwell time switches the amplifier output between the two sides of the output line which has a storage capacitor C8 across it. The shorter output dwell time allows the amplifier to come to equilibrium before the output contact closes and effectively eliminates the phase shift difficulties normally encountered witn sinewave amplification and the gain instability that results when the output is averaged over a part of the transit period. Assuming that the reference side of the output line has low impedance to the amplifier common, capacitor C8 will charge quickly to the appropriate voltage when connected on that side. The voltage presented to the other side of the output will then differ from the first by G (amplifier gain) times the voltage swing at the input and capacitor C8 will charge towards a value $V_0 = V \times G$. A ratio of C6/C8 of about three has been found to give an effective time constant of about one chopper cycle. Power drain through capacitor C6 will be zero as soon as C8 reaches its equilibrium value except of course for loading by output reading equipment. It will be seen that this circuit represents a precise DC amplifier with effectively zero offset.

What is claimed is:

1. Apparatus for measuring the conductivity of a liquid comprising:
   a. First and second current electrodes adapted to pass a current through the liquid whose conductivity is to be measured,
   b. First and second potential electrodes positioned adjacent said current electrodes,
   c. a source of regulated DC voltage comprising a regulated DC current source connected to a first resistor,
   d. a first reversing isolating chopper means whose input is connected across said first resistor for converting the voltage obtained therefrom to a square wave voltage having positive and negative pulses and whose output is connected across said first and second potential electrodes such that the square wave voltage is applied thereto,
   e. an operational amplifier having a resistance feedback path and having its input connected across said potential electrodes and providing at its output a square wave current,
   f. a regulated square wave power supply connected to said operational amplifier comprising a regulated DC voltage source connected to a second reversing isolating chopper means providing a square wave voltage at its output, said second chopper means being ganged to said first chopper means such that switching of the chopper means is in predetermined synchronous relation,
   g. a reference standard resistance connected to the output of the amplifier and in series with the current electrodes such that the output current of the amplifier passes through the standard resistance and the liquid under measurement via the current electrodes,
   h. a third reversing isolating chopper means operated in synchronism with the first and second reversing isolating chopper means and having its input connected across the reference standard resistance for demodulating the square wave voltage appearing across the reference standard resistance and providing a demodulated voltage at its output,
   i. a source of regulated reference DC voltage comprising the said regulated DC current source connected to a second resistor,
   j. means for measuring the difference between the demodulated square wave voltage and the regulated reference DC voltage and providing an output related to said difference.

2. Apparatus as in claim 1 wherein the means for measuring the difference between voltages is a storage capacitor for storing said voltage and a sampling and storage circuit for sampling said voltage and providing an output related to said voltage.

3. Apparatus as in claim 1 wherein the means for measuring the difference between voltages is a first storage capacitor for storing said voltage, on operational amplifier having a resistance feedback path giving fixed amplifier gain, a first switching means for switching an input of the operational amplifier from one side to the other of the said storage capacitor at a predetermined rate, an output storage capacitor, a second switching means connected to switch the output of said amplifier from one side to the other of said output storage capacitor, said second switching means being operated in synchronism with the first switching means and adapted to have a shorter dwell time such that the voltage appearing on said output storage capacitor is in direct amplified relation to the voltage on the first storage capacitor.

* * * * *